June 5, 1923.
A. W. WHARTON
AUTOMOBILE BUFFER
Filed Feb. 28, 1923
1,457,332
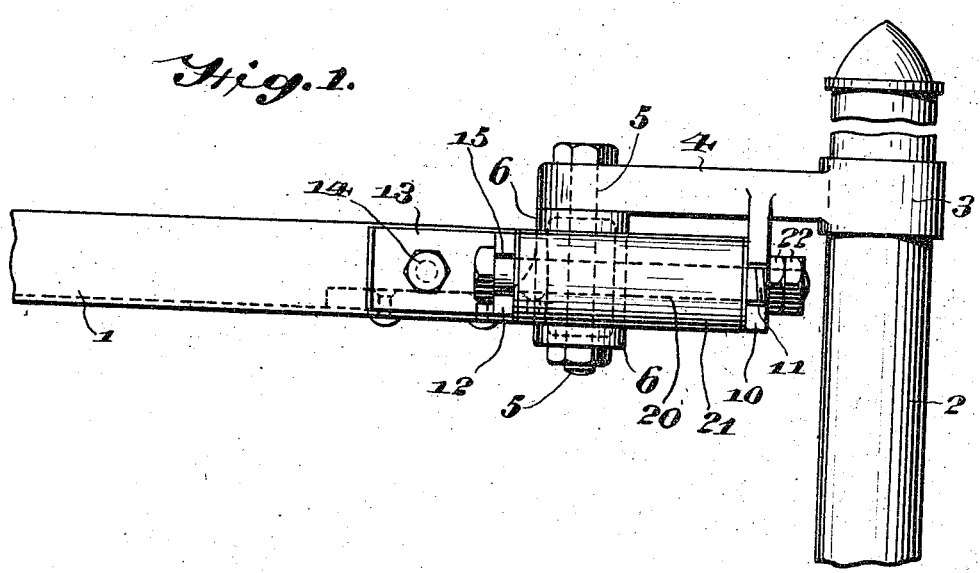
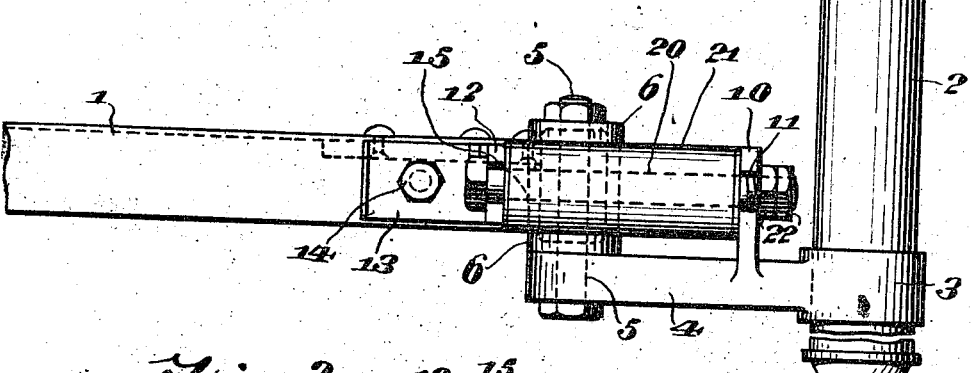
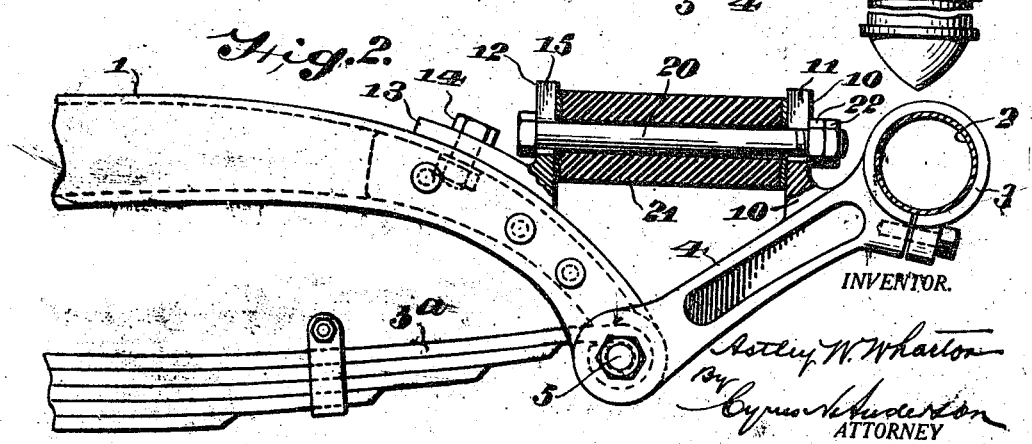
INVENTOR.
Astley W. Wharton
By Cyrus Anderton
ATTORNEY Patented June 5, 1923.

1,457,332

UNITED STATES PATENT OFFICE.

ASTLEY W. WHARTON, OF CHURCHVILLE, PENNSYLVANIA.

AUTOMOBILE BUFFER.

Application filed February 28, 1923. Serial No. 621,869.

*To all whom it may concern:*

Be it known that I, ASTLEY W. WHARTON, a citizen of the United States, and a resident of Churchville, in the county of Bucks and State of Pennsylvania, have invented an Improvement in Automobile Buffers, of which the following is a specification.

My invention relates to buffers for automobiles or other vehicles and it has for its object generally to simplify the construction without in any way impairing the efficiency thereof.

The invention consists in the combination and arrangement of parts as hereinafter fully described and pointed out in the claims and as illustrated in the accompanying drawing in which one convenient form of embodiment thereof is shown.

In the drawing:

Fig. 1 is a top plan view of a buffer embodying my invention and also showing end portions of the opposite sides of the chassis or frame of an automobile or other vehicle to which the buffer is secured; and Fig. 2 is a sectional side elevation of the same.

Referring to the drawing: 1 designates the opposite side members of a chassis or frame for an automobile, truck or the like and 2 a buffer bar supported in split bearings 3 upon the outer ends of arms 4 which are pivoted at their inner ends upon the outer end portions of bolts 5 which are situated in horizontal openings through the knub end portions 6 secured to the adjacent ends of the side members 1. These bolts also serve as means for connecting the ends of the springs 5ª to the side members 1 of the chassis or frame.

The arms 4 are provided with inwardly and upwardly extending projections 10 having slots 11 therein open at their upper ends. Upwardly extending projections or lugs 12 are secured upon the upper sides of the adjacent portions of the side members 1 of the chassis or frame in alinement with the projections 10 upon the arms 4. The lugs or projections 12 are provided with flange-like extensions 13 which rest upon the top sides of the frame members 1 and are secured thereto by means of bolts 14. The lugs or projections 12 are provided with slots 15 which are open at their upper ends, as indicated.

Although the openings through the projections 10 and 12 are preferably in the form of open ended slots, as shown, it is to be understood that these openings may be of any other form which may be desired or preferred.

Headed bolts 20 are located in the openings 11 and 15 and sleeves 21 of elastic material are mounted upon these bolts intermediate the projections 10 and 12. These sleeves, preferably consist of rubber or other like material but may consist of elastic and resilient material of any other kind or character which may be suitable for the purpose. Clamping nuts 22 upon the outer ends of the bolts 20 contact with the outer sides of the projections 10 and are adapted to clamp the elastic and resilient sleeves 21 between the projections 10 and 12. By adjusting these nuts 22 the pressure or tension under which the sleeves 21 are placed may be varied.

By reason of the tightness of the clamping action of the projections upon the elastic and resilient members 21 the bolts 20 are held within the slots 11 and 15 even though the upper ends thereof be open, as shown. It will also be apparent that the weight of the arms 4 and the buffer bar 2 carried thereby will tend to retain the bolts 20 in position in the said openings.

It will be seen that I have provided a simple form of buffer construction which may be readily attached to either the forward or rear end of the chassis or frame of an automobile or other like structure.

Having thus described my invention, what I claim and desire to secure by Letters Patent is:

1. In a buffer for automobiles, the combination of arms, means for connecting the inner ends thereof to an end portion of an automobile structure, projections extending upwardly from said arms, projections upon the automobile structure situated inwardly of and in alinement with the projections upon said arms, both said projections having openings therethrough, bolts extending through the said projections, and elastic means upon said bolts intermediate said projections, substantially as described.

2. In a buffer for automobiles and other vehicles, the combination of the chassis having oppositely disposed side members, outwardly extending arms situated in opposed relation to each other, means for pivotally connecting the inner ends of said arms to the adjacent ends of the said side members, a buffer bar supported upon the outer ends of said arms, projections extending upwardly from said arms, projections extending upwardly from the said side members, both said projections having openings therethrough, bolts extending through said openings, elastic means situated upon said bolts intermediate said projections, and means in engagement with said bolts for clamping the said elastic means between said projections, substantially as described.

3. In combination, the opposite side members of the frame of the body of an automobile or other vehicle, said side members having projections which are provided with slots open at their upper ends, arms extending outwardly from said side members, said arms having projections provided with slots open at their upper ends, which slots are in alinement with the slots in the projections upon the said side members, a buffer bar supported upon the outer ends of said arms, means for pivotally connecting the inner ends of said arms to the adjacent end portions of said side members, headed bolts in the said slots, elastic and resilient sleeve members upon said bolts between the said projections, and means upon said bolts for clamping the said projections upon the opposite ends of said sleeve members, substantially as described.

In testimony that I claim the foregoing as my invention, I have hereunto signed my name this 27 day of February, A. D. 1923.

ASTLEY W. WHARTON.